Patented Feb. 20, 1940

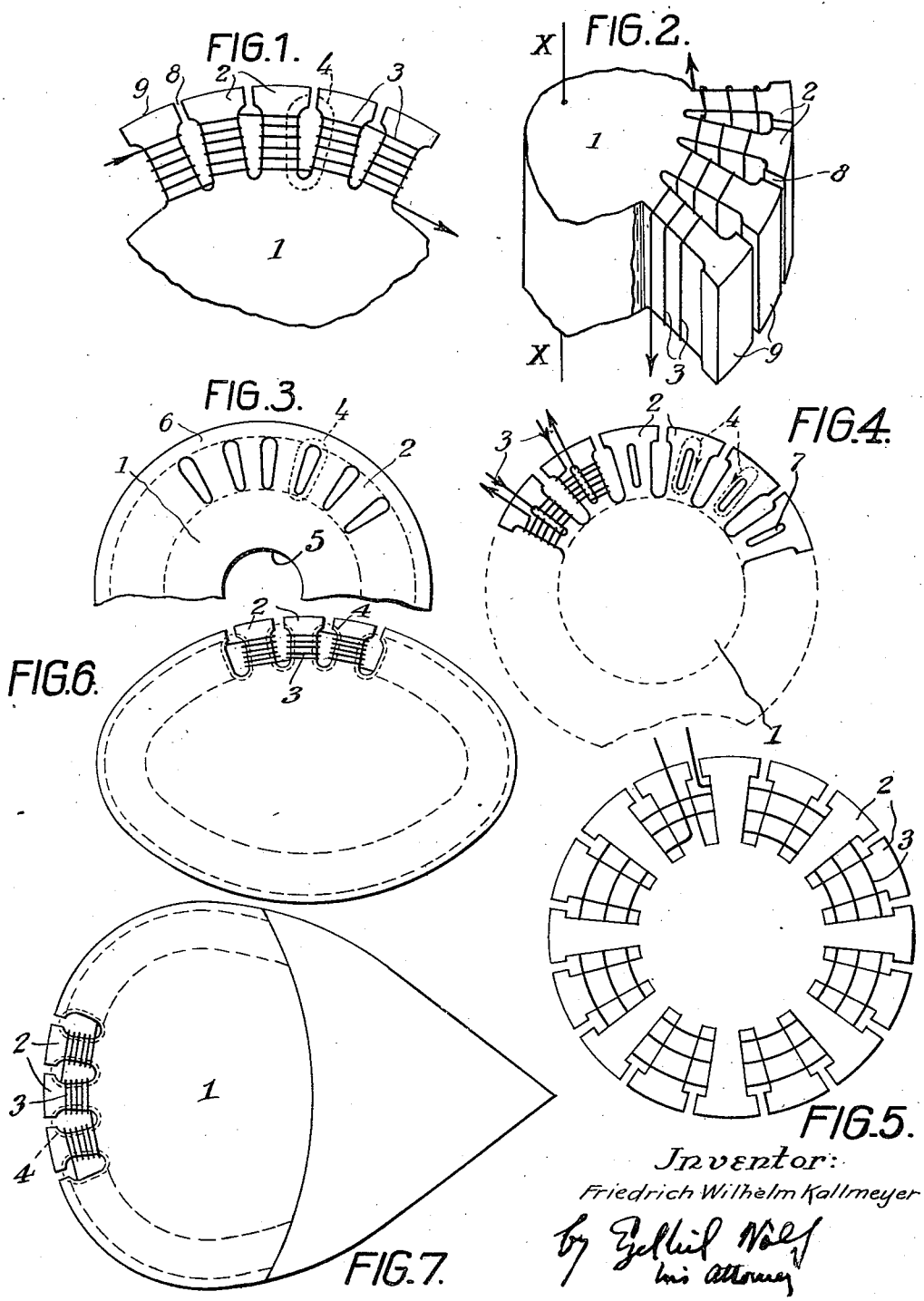

2,190,666

UNITED STATES PATENT OFFICE 2,190,666

SOUND TRANSMITTER AND SOUND RECEIVER ACTUATED BY MAGNETO-STRICTIVE FORCES

Friedrich Wilhelm Kallmeyer, Bremen, Germany, assignor to Submarine Signal Company, Boston, Mass.

Application July 2, 1935, Serial No. 29,576
In Germany July 4, 1934

5 Claims. (Cl. 177—386)

For the transformation of electrical energy in mechanical oscillations and vice versa, and especially for the purpose of sound transmission or sound reception, the magneto-strictive qualities of nickel and nickel alloys are utilized in many cases. Transformation takes place in such a manner that in a body capable of oscillating, or parts thereof, made of such material, an alternating magnetic field is created by a suitably arranged coil, traversed by alternating current, whereby said alternating field on its part produces magneto-strictive forces in the material stimulating such body to oscillations. It is further known that it is advantageous to magnetically polarize the magneto-strictive material by a coil traversed by direct current. Such stimulation is generally effected in a resonance speed of the oscillation structure. Magnetisation by the alternating field does not as a rule, extend uniformly over the area of the cross section of the oscillation structure, the alternating flow being conducted, in fact, in such a manner, that it is strongest where it exerts its most advantageous effect. It is further known to magnetically subdivide the body capable of oscillating and being stimulated by magneto-strictive forces, with the aim in view to reduce eddy current losses and flow displacement to a low amount. Hence, such bodies are not made from the solid, but of sheet iron, wires, tubes, etc., of slight thickness.

The structure form to be selected and its kind of oscillation essentially depend on the desired direction of sound radiation. Although oscillators of this kind for transmitting and receiving signals and noises can be used in any desired medium, there shall be considered here principally the case of sound transmission and sound reception under water. Special conditions obtain here insofar, as transmitter and receiver are usually in the same horizontal plane in the vicinity of the upper limiting surface of the medium. In shallow water the lower limiting surface moves up so closely to the upper one that the interval becomes small as compared with the interval of sound source and receiver. Sound distribution then takes place in a relatively thin layer and a plane problem is to be dealt with. Hence, it will be advantageous to use sound radiators, whose characteristic corresponds to a maximum of the effect in a horizontal plane. Also, if with greater depth of water or with immersed travelling noise sources the conditions of the plane problem are not met any longer, it will nevertheless be of advantage, to use sound radiators with horizontal directive action, so as to exclude from reception the waves reflected on the limiting surfaces, which are apt to cause weakening of the sound volume and regular fading phenomena. Hence, if transmission and receipt of signals in water comes into question, it will be of advantage to so arrange the directive characteristic of the sound radiator, that transmission takes place with the same energy to all sides of the horizontal plane and receiving can take place from all directions.

But it may also occur, that the sound radiation is to embrace only a certain angular area, which is to be selected at will. Radiators with such qualities may, for instance, be used with the method for ascertaining the distance of foreign bodies by means of reflected waves, so as to make simultaneous determination of direction possible.

For radiating sound towards all sides in the direction of a plane, systems have been in use heretofore having the form of a radially oscillating cylindrical ring. By changing the height of the cylinder one was in a position to change the directive action in vertical direction and to concentrate the sound more or less in the horizontal plane. With oscillating rings of this kind mass and elasticity are uniformly distributed over the cross section. The number of natural oscillations $f_0$ of a radially oscillating ring is shown by the formula $$f_0 = \frac{a}{2\pi r}$$

$a$ being the velocity of the sound for the material of the ring and $r$ the mean radius of the latter. Hence, the mean diameter is in a definite relation to the number of oscillations, and as, furthermore, the width of the ring cannot exceed a certain measure in relation to the diameter, the same applies similarly to the outer diameter. Hence, the diameter of the ring is established, with slight deviations, once the number of the oscillations having been fixed.

The maximum sound output obtainable from a body capable of oscillating and stimulated by magneto-strictive forces grows with the mass of the effectively employed material. Thus, if it is desired to increase the output of a ring radiator of certain tuning, this will be possible only by increasing the height of the ring cylinder. But by so doing, a stronger concentration of the sound in the plane perpendicular to the axis of the cylinder is obtained, which is not always desirable. Hence, the first variable cannot be changed without influencing the second.

One is further not in a position to influence with the known oscillating rings the radiating intensity within the horizontal plane by azimuth angles. The radiators radiate in all directions of the horizontal plane with like intensity.

It has now been accomplished by using oscillating parts in certain arrangement and a suitable manner of excitation, to create a body, capable of oscillating, with cylindrical radiating surface, with which, on the one hand, the diameter and in connection therewith, the maximum sound output depending on the quantity of the material, can be changed independent of the tuning of the system and with which, on the other hand, the system is adapted for receiving signals arriving from any direction. There is further the possibility to at will shape the horizontal characteristic of the radiator, be it by special form of the cylinder cross section or by special electrical connections.

The object of the invention is a magnetostrictive oscillator, whose radiating surface is of a cylindrical, though not necessarily circular-cylindrical form, and with which this surface is formed by the face surfaces of oscillating extensions, seated on an inner cylindrical body which latter may be considered as being essentially rigid. In using a circular cylinder the cross section of such radiator presents about the same picture as the rotor of an alternating current machine. The extensions oscillating vertically to the circumferential surface of the cylinder are provided with a winding carrying alternating current, this being suitably done in such a manner, that the magnetic flow has opposite sense for two consecutive extensions in order to obtain a well closed magnetic circuit. In general all extensions will be tuned to the same frequency. The cylindrical inner body carrying the extensions may be made hollow for the purpose of reducing weight. And, in addition, the extensions can come together at their face surfaces to form a continuous ring again with the aim of improving the flux.

For the purpose of making possible operation of the individual extensions independent of one another, they may be provided with one or more slots for accommodating a winding, and this should be done in such a manner, that the flux pervading one of the extensions closes within the latter itself. In this case each extension may be provided with a special winding, whose starting and finishing ends are brought out separately for each extension, so that each extension may be actuated at will, individually or together with several or all extensions, as transmitter or receiver.

The nature of the invention is elucidated by several modes of construction illustrated in the drawing in which Figure 1 shows a fragmentary plan view of the device; Figure 2 shows a view of the device of Figure 1 in perspective; Figure 3 shows a modification of the device of Figure 1 in cross section; Figure 4 shows a further modification in plan view; Figure 5 shows a still further modification; and Figures 6 and 7 show modifications of the device in different shapes.

In Figure 1 the cylindrical outer surface of the radiator has its axis coinciding with the direction of the axis of the cylindrical core. 1 is a part of the solid cylindrical core, 2 are some of the extensions seated thereon, surrounded by windings 3. The core 1 may be made up of flat laminations pressed together, forming a central body portion and the radially extending arms 2 about which the coils 3 are placed. The dotted line shows the course of a line of force. At the face surfaces the extensions are separated only by narrow intervals 8 in order to present as small a resistance as possible to the flux. The winding 3 has opposite sense for two extensions arranged alongside of each other.

In Figure 2 the height of the cylinder in the direction of the axis $x-x$ is selected according to the desired sharpness of the directive characteristic of the radiating surfaces 9.

Figure 3 shows in accordance with the invention the cross section of an oscillator of circular-cylindrical form perpendicular to the axis of the cylinder, on which the extensions 2 at their face surfaces unite with one another. Hence, the air gap interrupting the flux of force according to the dotted line 4 is wanting here and the outer cylinder surface is not interrupted. The winding has been omitted for the sake of clearness. The inner cylinder 1 is provided with a bore 5 to reduce the weight. Joining the end surfaces of the extensions to form a ring 6 makes a slight change of tuning necessary which must be taken into account.

Figure 4 shows a radiator according to the invention with which the individual extensions can be actuated independent of each other as transmitter or receiver. 1 is the inner cylinder to be regarded as essentially rigid, 2 are the individual extensions which, each by itself, is again provided with a slot 7. 3 is the winding brought out separately for each bar. The dotted line 4 shows the course of the flux of force within the individual extensions. As indicated by arrows, the sense of rotation of the flux of force changes from extension to extension, mutual influence being avoided thereby.

In Figure 5 is shown a special kind of winding for a radiator in accordance with the invention in which the individual extensions 2 are not provided with separated windings as in Figure 1, but with a continuous joint winding 3, passing serpentine-like around the extensions. This form of winding can of course be used only if all extensions are always to be actuated simultaneously.

Figure 6 shows the device in an oval or elliptical form with the arms 2 spaced around the ellipse similarly as the cylindrical form of Figure 1.

Figure 7 shows the device as streamlined with the arms preferably in the forward part of the body.

One is in a position to at will increase the maximum radiation output by enlarging the circumference of the cylinder of radiators of the form described, without thereby influencing the tuning and the directive qualities of the system. The tuning can be brought to any desired value by changing the length of the extensions in a radial direction to the radiating cylinder surface, while the directive qualities, as mentioned repeatedly, can be influenced in vertical direction by changing the height of the cylinders in horizontal direction by deviating from the circular-cylindrical form or by stimulating the extensions with phase-displaced currents, if needs be, by combining parts thereof, into groups.

Deviation from the circular form can, for instance, also be advantageous, if the radiator is to be actuated from a moving ship outside of the ship in flowing water. It is then of importance to keep the resistance of the water current low, and it will be of advantage for this reason to give the cross section of the cylindrical radiators oval, elliptic or streamline form.

For the purpose of transmitting or receiving sound preferably in certain direction of the horizontal plane it is advantageous to use a system of the kind shown in Figure 4, in which the individual extensions can operate independently as transmitter or receiver. If the height of the cylinders is not selected very low half of the extensions will hereby always be screened, and for this reason it may be of advantage to actuate at the time only a part of the extensions as transmitter or as receiver. In order to obtain, when operating as transmitter, horizontal directive action, the used extensions must be actuated with currents of corresponding phase displacement.

The application of the system is not limited solely to the cases described in the foregoing, in which radiation is preferably desirable in a horizontal plane with the axis of the cylinder being in a standing position. If one reduces the height of the cylinder to less than about ¼ of the wave length the system will then have the characteristic of a continuously radiating circular line. The directive sharpness of the radiation depends on the diameter of the radiating ring, which in a construction according to the invention can be selected as large as desired, differing in this respect from the known ring radiators, without affecting the tuning thereby. Such system may be used for directed transmitting and receiving in a horizontal plane, viz. in such a manner, that the cylinder axis standing vertically on the circular surface is adjusted to the various directions of the horizontal plane.

The described systems are advantageously produced by piling upon one another punched iron sheets having the form of the cross section vertical to the axis of the cylinder, so that the extensions form a whole with the solid inner body.

I claim as my invention:

1. Means for transmitting and receiving high frequency compressional waves comprising a cylindrical magnetostrictive core element made up of flat laminations forming when assembled a central body portion and radially extending arms of equal length, said arms extending substantially the entire length of the core, said arms having flanges towards their external ends substantially arcuately positioned extending towards one another whereby the magnetic circuit from one radial arm may be completed through the next radial arm in a low magnetic reluctance path, the surface of the outer portions of said arms and of said flanges which make up the cylindrical outer surface being compressional wave radiating surfaces and coil means positioned about said arms for generating electromagnetic flux therein to flow in opposite directions in said arms.

2. Means for transmitting and receiving high frequency compressional waves comprising a group of flat circular laminations having a central core element and radially extending arms of equal length, said arms extending axially the entire length of the core, said radial arms having substantially arcuate flanges extending from the ends thereof to form a substantially continuous cylindrical surface, being compressional wave radiating surfaces but for an airgap between each arm and means for generating electro-magnetic flux to flow in opposite directions in said arms in said radial elements, said radial elements having magnetostrictive properties.

3. Means for transmitting and receiving sound waves of high frequencies comprising a plurality of laminated elements packed together to form a body having radial arms extending outward from a central core, said arms being of magneto strictive material and coil means surrounding said arm elements for generating a magnetic flux therein, the ends of said radial arms being exposed to the sound propagating medium.

4. Means for transmitting and receiving high frequency sound waves comprising a group of flat circular laminations forming a cylindrical surface with a center core and radial elements extending from the center core to the cylindrical surface, means surrounding said radial elements for generating the magnetic flux therein, said radial elements being made of magnetostrictive material, the ends of said radial arms being exposed to the sound propagating medium.

5. Means for sending and receiving high frequency sound waves comprising a group of flat circular laminations of magnetostrictive material having a center core and radial elements extending therefrom with the free ends thereof formed with surfaces facing one another and nearer together than the space between said elements adjacent the core, means for generating electromagnetic flux in a magnetic circuit formed by the core, successive radial elements and the adjacent end surfaces whereby the external edges of said laminations form a substantially cylindrical radiating surface for the sound sender and receiver.

FRIEDRICH WILHELM KALLMEYER.